United States Patent [19]
Hill

[11] 3,988,565
[45] Oct. 26, 1976

[54] NUCLEAR REACTOR FUEL ROD THERMAL SIMULATOR

[75] Inventor: Eugene F. Hill, Belmont, Calif.

[73] Assignee: Varian Associates, Palo Alto, Calif.

[22] Filed: Nov. 14, 1974

[21] Appl. No.: 523,933

Related U.S. Application Data

[63] Continuation of Ser. No. 368,559, June 11, 1973, abandoned.

[52] U.S. Cl. ............................ 219/121 R; 219/50; 219/200; 313/93; 315/111
[51] Int. Cl.² ............................................ H05B 7/16
[58] Field of Search .............. 219/50, 121 R, 200; 313/93, 25, 26, 231, 216, 312, 324, 325; 315/111

[56] References Cited
UNITED STATES PATENTS

| | | | |
|---|---|---|---|
| 2,944,179 | 7/1960 | Lafferty | 313/93 X |
| 3,013,156 | 12/1961 | Hearn | 313/93 X |
| 3,482,133 | 12/1969 | Dugdale et al. | 219/121 R X |
| 3,846,574 | 11/1974 | Rordorf | 219/121 R X |

*Primary Examiner*—J. V. Truhe
*Assistant Examiner*—N. D. Herkamp
*Attorney, Agent, or Firm*—Stanley Z. Cole; Leon F. Herbert; John J. Morrissey

[57] ABSTRACT

The tubular stainless steel structure of a nuclear reactor fuel rod thermal simulator is heated to nuclear fuel rod operating temperatures by means of a gaseous glow discharge established within the tubular structure. In a preferred embodiment a length of the simulated fuel rod is internally clad with tungsten, or Mo or alloys thereof, hermetically sealed at both ends and filled with a glow discharge sustaining gas such as hydrogen or helium. A center electrode structure, as of tungsten, or Mo or alloys, is centrally disposed within the gas filled tubular envelope. Power is applied between the center electrode and the outer tubular envelope for initiating and sustaining the glow discharge for heating the outer tubular envelope to nuclear fuel rod simulating temperature.

14 Claims, 6 Drawing Figures

U.S. Patent  Oct. 26, 1976  3,988,565
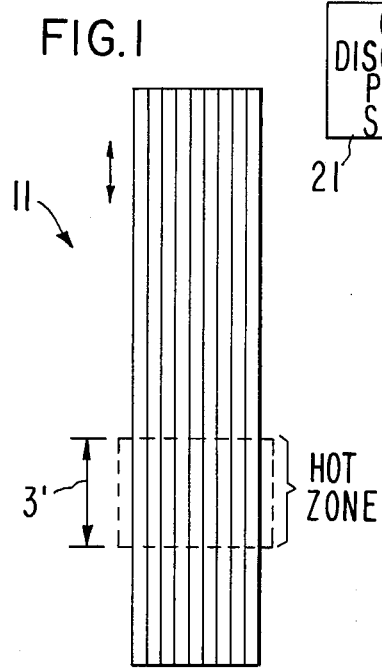
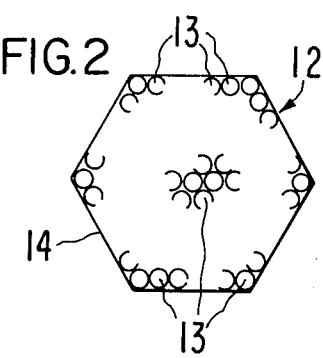
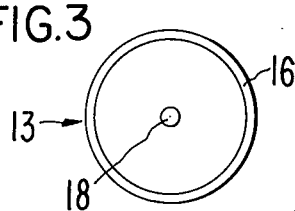
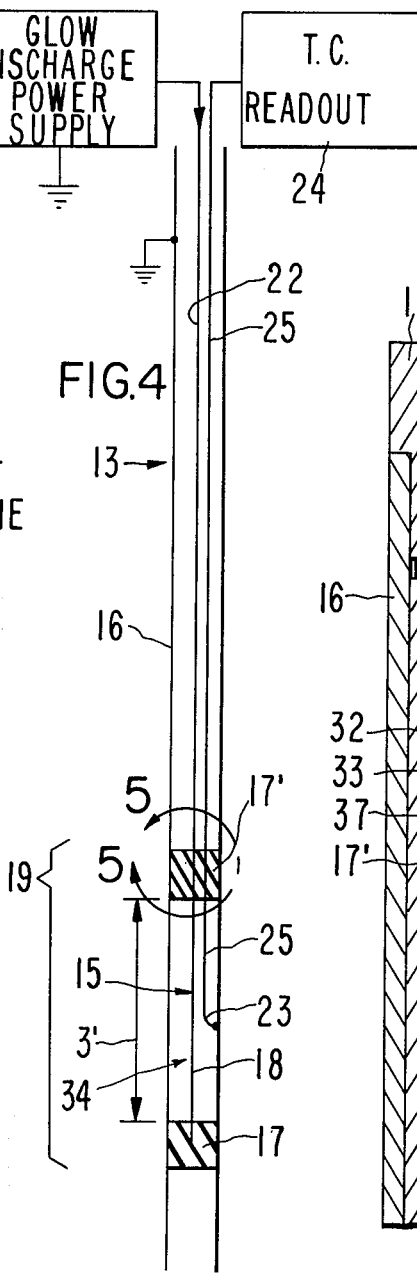
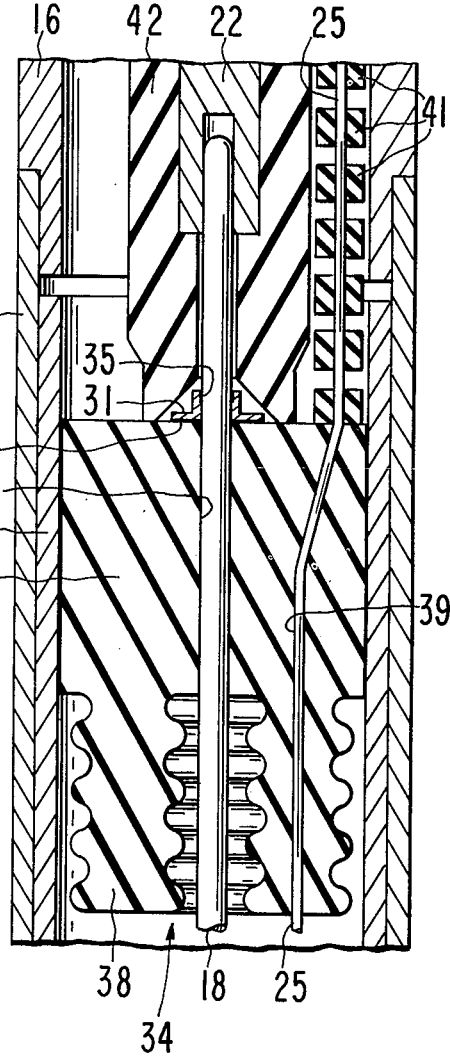
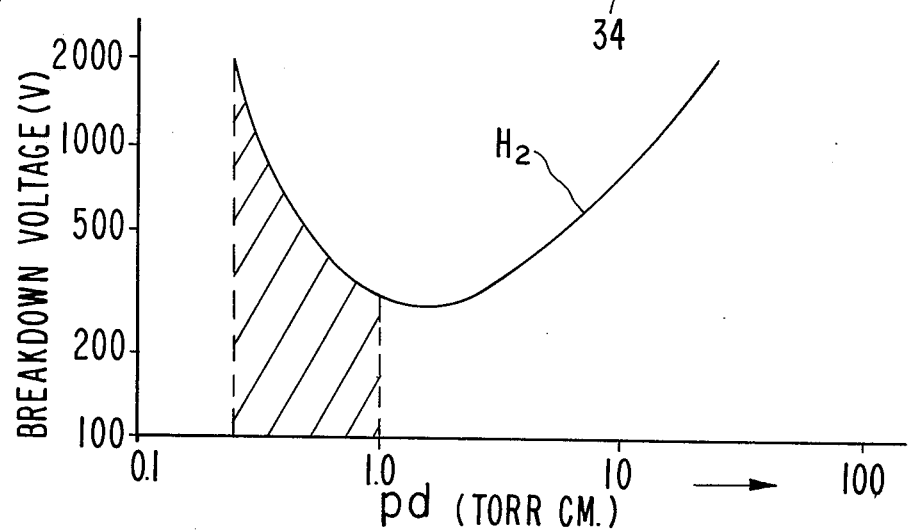

NUCLEAR REACTOR FUEL ROD THERMAL SIMULATOR

This is a continuation of application Ser. No. 368,559 filed June 11, 1973, now abandoned.

BACKGROUND OF THE INVENTION

The present invention relates in general to nuclear reactor fuel rod thermal simulators for simulating the thermal characteristics of a nuclear reactor fuel rod and assemblage thereof.

DESCRIPTION OF THE PRIOR ART

Heretofore, nuclear reactor fuel rod thermal simulators have been constructed wherein an electrical heating element was supported in electrically insulative relation within a stainless steel tubular jacket for simulating the thermal characteristics of a nuclear reactor fuel rod. Such rods are approximately 0.250 inch OD, and 8 to 20 feet long and include a hot zone or heated length intermediate the length of the rod of approximately 3 feet in length.

In these prior art electrically heated fuel rod simulators, the high resistance heating element was made of a platinum alloy with the heating element electrically insulatively supported within the tubular jacket by means of boron nitride particles compacted to a very high density by means of applying a relatively high pressure to the packing material as of 65,000 to 100,000 PSI.

In use, electrical current is passed through the resistive heating element to raise the temperature of the heating element to approximately 2,300° C. At this temperature the boron nitride must be very pure to prevent undesired reactions between the hot heating element and the impurities in the boron nitride. The boron nitride has a relatively high thermal conductivity and serves to conduct the heat from the heating element to the stainless steel jacket. A relatively large number, as of up to 350, such fuel rod simulators are relatively closely packed within a fuel element subassembly and a coolant such as water, gas or liquid sodium is passed through the spaces between adjacent fuel rod simulators for cooling same. In use, in the case of sodium coolant, the outside surface of the fuel rod simulator runs at a temperature as high as 900° C. The normal heat flux demanded by the fuel rod simulator typically falls within the range of 300 watts per square centimeter to 1,000 watts per square centimeter.

Some of the problems encountered in the manufacture and use of the prior art resistive heater type nuclear fuel rod simulators is that manufacturing yield is relatively low due to the difficulty in providing a precise centering of the heating element relative to the surrounding jacket. This is required to eliminate the formation of hot spots due to uneven spacing. Also, if the spacing is not precise, it is possible that the heating element can be electrically shorted to the surrounding jacket. Also, due to the relatively poor thermal connection made between the heating element and the surrounding jacket through the intermediary of the boron nitride, a relatively high thermal gradient exists therebetween rquiring the heater to operate at a relatively high temperature as of 2300° C in order to achieve 900° C at the outer surface of the surrounding stainless steel jacket.

It has also been proposed to heat the outer jacket of a simulated nuclear fuel rod by electron bombardment from a centrally disposed thermionic cathode emitter contained within an evacuated length of the fuel rod. One problem with this approach is that it turns out that a substantial amount of hydrogen is present in the coolant circulating around the outside of the respective fuel rod simulators. When the fuel rods are operating at elevated temperatures, hydrogen diffuses through the walls of the fuel rods into their evacuated central regions to destroy the vacuum and render the electron bombardment heaters inoperative. The rate of hydrogen diffusion is so great, and the elongated fuel elements have such a high impedance to the flow of gas therethrough, that it is not possible to pump the fuel rods with a vacuum pump in such a manner as to maintain the vacuum.

SUMMARY OF THE PRESENT INVENTION

The principal object of the present invention is the provision of an improved nuclear reactor fuel rod thermal simulator and more particularly to an improved heater for same.

In one feature of the present invention, the outer jacket of a nuclear reactor fuel rod thermal simulator is heated by means of a glow discharge established within the tubular jacket for heating same to operating temperature.

In another feature of the present invention, a glow discharge heater for a nuclear reactor fuel rod thermal simulator includes an electrode structure disposed within a tubular jacket in electrically insulative relation therewith such jacket being hermetically sealed and filled with a glow discharge supportive gas such as hydrogen or helium.

In another feature of the present invention, the glow discharge heater for a nuclear reactor fuel rod simulator includes a central electrode structure and an outer electrode structure and wherein such electrode structures are both made of tungsten or molybdenum or alloys thereof such as Mo-Re, Pt, etc. with the outer electrode being disposed in thermal exchanging relation with the outer jacket of the fuel rod simulator.

Other features and advantages of the present invention will become apparent upon a perusal of the following specification taken in connection with the accompanying drawings wherein:

BRIEF DESCRIPTION OF THE DRAWINGS

FIG. 1 is a simplified side elevational view of a nuclear reactor fuel rod assemblage utilized in the core of a nuclear reactor, FIG. 2 is a cross-sectional view of one of the nuclear reactor fuel rod subassemblies of FIG. 1, FIG. 3 is an enlarged transverse sectional view of a nuclear fuel rod thermal simulator, showing the heating structure of the present invention, FIG. 4 is a longitudinal sectional view, partly in block diagram form, of the nuclear reactor fuel rod thermal simulator of the present invention, FIG. 5 is an enlarged detail view of a portion of the structure of FIG. 4 delineated by line 5—5, and FIG. 6 is a plot of breakdown voltage in volts vs. the quantity pd in torr centimeters for the glow discharge heater of the present invention where hydrogen is the glow discharge sustaining gas and where p is the pressure in torr of the discharge and d is the distance in centimeters between the anode and the cathode in the glow discharge region.

DESCRIPTION OF THE PREFERRED EMBODIMENTS

Referring now to FIG. 1, there is shown in greatly simplified form the fuel rod assembly for a nuclear reactor. More particularly, the fuel rod assembly 11 includes an assemblage of elongated nuclear fuel rod subassemblies 12 as of hexagonal cross-section as shown in FIG. 2. The subassemblies 12 each include a multiplicity, of up to 350, individual fuel rods 13. The fuel rods 13 are arranged in a closely packed geometry within a hexagonal envelope 14. In a typical example, there are approximately 100 fuel subassemblies 12 within the fuel assembly 11 of the core of the nuclear reactor. The subassemblies 12 are axially translatable within the core of the reactor. The fuel rods 13 are typically between 8 and 20 feet long and approximately one quarter of an inch in outside diameter for sodium cooled reactors. (Water cooled reactors may be up to 1 cm.) A fluid coolant as of gas, water or sodium is caused to flow axially of the bundle of fuel rods 13 in the spaces between the adjacent rods. In a typical example, there is approximately 17 to 32% of the rod diameter spacing between adjacent fuel rods 13 at their point of closest approach to define the coolant passageways therebetween.

In a typical reactor, only a portion of the length of the fuel rods is located within the hot zone of the reactor such that only approximately a 3 foot section of the length of the fuel rods is subjected to the intense heat of the nuclear reactor.

Referring now to FIGS. 3 and 4, there is shown the nuclear reactor fuel rod thermal simulator 13 of the present invention. More particularly, the simulator rod 13 includes a glow discharge heater structure 15 for heating the simulator rod 13 over a portion of its length corresponding to the hot zone of the reactor to be simulated. Simulator rod 13 includes an outer tubular jacket 16 as of stainless steel having a 0.010 to 0.015 inch wall thickness and having an outside diameter of 0.250 inch. The stainless steel tube 16 has an overall length as of 8 to 20 feet.

A pair of electrical insulator assemblies 17 serve to electrically insulate a center electrode structure 18 of the glow discharge heater 15. In addition, the insulator assemblies 17 are hermetically sealed between the heater electrode 18 and the inside wall of the tubular jacket 16 at opposite ends of the hot zone 19. The space between the inner electrode 18 and the surrounding jacket 16 is evacuated and filled with a glow discharge supportive gas as of hydrogen or helium.

A glow discharge power supply 21 is connected between the center electrode structure 18 and the outer jacket 16 for supplying the proper potential and current to the glow discharge region of the heater 15. One side of the power supply 21 is connected to ground as is the outer conductor or stainless steel jacket 16 of the fuel rod simulator 13. The center conductor 18 of the glow discharge heater 15 is connected to the power supply via an insulative lead 22 passing axially of the tubular fuel rod 13.

One or more thermocouples 23 are affixed in thermal exchanging relation with the inside of the stainless steel jacket 16 within the hot zone region 19 for measuring the temperature of the fuel rod simulator 13. Leads 25 for the thermocouples 23 pass axially of the tube 16 and through the upper insulator body 17' to respective ones of the thermocouples 23. A thermocouple readout circuit 24 is coupled to the leads 25 for reading out the temperature of the nuclear fuel simulator 13.

Referring now to FIG. 6, the spacing between the center electrode 18 and the inside wall of the tubular jacket 16, in the glow discharge heater 15, are dimensioned preferably for operation in the abnormal region of the glow discharge as indicated by the cross-hatched region of the plot of FIG. 6. This region of the glow discharge is referred to as the abnormal region wherein the glow discharge current increases with an increase in applied voltage. In this region of the discharge, the upper limit to the glow discharge current is set by the overheating of some part of the glow discharge heater 15 or by a glow-to-arc transition. Thus in a preferred range of operation, the pd product falls within the range of 0.2 and 1.0 torr centimeters at operating temperature.

Although hydrogen is shown as the glow discharge sustaining gas in the plot of FIG. 6, other suitable gases would include helium. Hydrogen and helium are preferred because they are relatively light-weight atoms and produce the least amount of sputtering. Sputtering is undesired because it serves to erode the electrodes and the sputtered material can coat over the insulators 17, thereby rendering them inoperative. In a typical example, the inner electrode 18 is made of tungsten wire having an O.D. of approximately 0.060 inch, the inside wall of the tubular jacket 16 has a diameter of 0.210 inch giving a spacing d of approximately 0.2 centimeters and a pressure of hydrogen or helium fill gas of 2.5 torr at operating temperature. The gas fill pressure preferably falls within the range of 1 and 10 torr at operating temperature of the glow discharge. The operating temperature of the glow discharge is generally between 3.5 and 5 times room temperature. Thus, the gas fill pressure under standard conditions of temperature and pressure will be between 1/3.5th and 1/5th the pressure in operation. Also in this regard, the desired fill pressure preferably takes into account outgassing of the metallic portions of the tubular envelope. This outgassing serves as a source of gas which adds to the original gas fill with time and temperature and depends upon the past history of the metallic parts making up the envelope. The outgassing contribution is best determined empirically and taken into account in the original gas fill.

In one operating mode the power supply is polarized to make the center electrode 18 the cathode and the outer electrode 16 the anode. In this manner, high energy electrons serve to provide heating of the outer jacket 16, whereas ions incident on the cathode 18 serve to sustain the discharge by producing secondary electrons at the cathode. For a more detailed description of the various types of glow discharges and their heating characteristics, see an article appearing in the Journal of Material Science I (1966) pages 160–169, in an article titled "The Application of the Glow Discharge to Material Processing" by R. A. Dugdale.

Other modes of operation of the glow discharge include supplying alternating potential and current across the gas fill between the electrodes or reversing the polarity of the d.c. power supplied to the glow discharge, thereby making the center electrode 18 the anode and the outer jacket 16 the cathode.

Referring now to FIG. 5, there is shown a detail view of the upper end seal of the glow discharge heater 15.

More particularly, the insulator body 17', as of thorium dioxide, sapphire, alumina, or beryllia is hermetically sealed to the center electrode 18 via the intermediary of a metallic flange 31. The flange 31 is sealed as by metallizing to the outer lip portion 32 of a central bore 33 in the insulator body 17' through which the center conductor 18 passes with substantial clearance therearound into the glow discharge region 34 of the glow discharge heater 15. The flange 31 is hermetically sealed to the center electrode 18 as by heliarc welding at 35.

The outer periphery of the insulator body 17 is hermetically sealed to the inside wall of the tubular jacket 16 as by metallizing the insulator body 17 and brazing same to the inside wall of the tube 16. In a preferred embodiment, the tubular wall 16 includes a liner 37 of tungsten or molybdenum and alloys thereof with Re, Pt, etc. at the inside surface. The liner 37, in a typical example, has a wall thickness as of 0.005 to 0.010 inch and is intimately bonded to the inside wall of the stainless steel portion of the envelope 16 as by drawing the outer stainless steel wall 16 down onto the liner tube 37. The liner 37 serves to provide a more refractory liner to receive the particle bombardment obtained by the glow discharge for heating same and also has a very low hydrogen diffusion rate.

In an alternative embodiment, helium or other glow discharge sustaining gases are used as the gas fill such that hydrogen diffusion through the walls of the envelope is not so important. Thus in this case, the liner 37 is eliminated, thereby considerably reducing the complexity of the simulator structure and improving the heat transfer through the outer wall 16.

The insulator body 17 includes an axially directed cylindrical portion 38 projecting into the glow discharge region 34 for providing a long current leakage path to prevent shorting of the inside electrode 18 to the outer electrode or envelope 16. In addition, the tubular projection 38 is preferably corrugated for further increasing the leakage path and minimizing the possibility of depositing sputtered material into the valleys of the corrugated portion of the structure.

A plurality of feed-through metallic pins 39 pass axially through the insulator body 17' for making electrical connection to the thermocouples within the glow discharge chamber 34. The feed-through pins 39 are hermetically sealed to the insulator body 17' and are bonded as by welding to leads 25. Insulator beads 41 are strung on the leads 25 to provide electrical insulation between thermocouple leads and the grounded envelope 16. A refractory tubular insulator 42 also surrounds the inner conductor 18 and lead 22 for insulating the lead and center conductor 18 from the rounding tubular wall 16.

In an alternative embodiment, the center tungsten electrode 18 is hollow and partially filled with silver such that when the center electrode 18 is heated to operating temperature the silver is vaporized and acts as a heat pipe to provide uniform temperature distribution within the center electrode 18 to prevent hot spots.

The advantage of the glow discharge heated nuclear reactor fuel rod thermal simulator of the present invention, as contrasted with the prior art resistance heated simulator, is that the simulator structure of the present invention is more easily fabricated as the tolerances are less critical. In addition higher heat flux densities are more easily accommodated in the structure of the present invention. This latter feature is particularly significant for fast breeder reactor fuel rod thermal simulators where the heat flux demand is several times that required for either the water cooled or gas cooled fuel rod simulators.

What is claimed is:
1. A nuclear reactor fuel rod simulator comprising:
an elongated tube,
a first hermetic sealing means disposed within said tube, remote from one end of said tube,
a second hermetic sealing means disposed within said tube between said first sealing means and the other end of said tube,
each of said sealing means being hermetically sealed to the inner surface of said tube,
said first and second sealing means being spaced apart to form a glow discharge space in a localized position along said tube, and
means for establishing a glow discharge in said glow discharge space and thereby heat said tube to nuclear reactor fuel rod operational temperature.

2. The fuel rod simulator of claim 1 wherein said glow discharge establishing means comprises:
an electrode disposed within and spaced apart from the outer walls of hermetically sealed portion of said tube in electrically insulated relation therewith,
lead means for communicating from said electrode to the exterior of said tube,
a gas supportive of a glow discharge filling the space between said inner electrode and the walls of said tube within said hermetically sealed portion, and
a second electrode comprising the walls of said tubular structure.

3. The fuel rod simulator of claim 2 wherein said gas is selected from the class consisting of hydrogen and helium and mixtures of hydrogen with helium.

4. The fuel rod simulator of claim 2 wherein said inner electrode is made of a material selected from the class consisting of tungsten, molybdenum, alloys of tungsten and alloys of molybdenum.

5. The fuel rod simulator of claim 2 wherein said gas fills said hermetically sealed portion of said tubular structure to a pressure which assumes a value in the range from 1 to 10 torr at operating temperatures of a nuclear reactor.

6. The fuel rod simulator of claim 2 wherein the product pd at operating temperatures of a nuclear reactor falls within the range from 0.2 to 1.0 torrcentimeters, where d is the spacing in centimeters between said inner electrode and said surrounding tubular structure in the glow discharge region, and p is the pressure in torrs of said glow discharge gas at the operating temperature of the glow discharge.

7. The fuel rod simulator of claim 2 wherein said inner electrode comprises an evacuated structure, and wherein a quantity of silver partially fills the interior of said evacuated structure for providing a uniform temperature distribution within said evacuated structure.

8. The fuel rod simulator of claim 2 wherein the outside diameter of said inner electrode is less than 0.08 inch.

9. The fuel rod simulator of claim 1 further comprising power supply means for supplying a glow discharge supportive electrical potential between said tube and said inner electrode.

10. The fuel rod simulator of claim 1 wherein said tube comprises outer and inner concentric tubes disposed in heat exchanging relation with each other, said inner tube being made of a material selected from the class consisting of tungsten, molybdenum, alloys of tungsten and alloys of molybdenum.

11. The fuel rod simulator of claim 10 wherein said outer tube is made of stainless steel.

12. The fuel rod simulator of claim 1 further comprising thermocouple means disposed within said hermetically sealed portion of said tubular structure for measuring the temperature thereof.

13. The fuel rod simulator of claim 12 further comprising a thermocouple readout circuit.

14. The fuel rod simulator of claim 1 wherein the outside diameter of said tubular structure is less than 0.50 inch.

* * * * *